(12) United States Patent
Sigler et al.

(10) Patent No.: US 9,969,026 B2
(45) Date of Patent: May 15, 2018

(54) WELD SCHEDULE FOR RESISTANCE SPOT WELDING OF ALUMINUM ALLOY WORKPIECES

(75) Inventors: David R. Sigler, Shelby Township, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1928 days.

(21) Appl. No.: 13/309,825

(22) Filed: Dec. 2, 2011

(65) Prior Publication Data

US 2013/0048613 A1    Feb. 28, 2013

Related U.S. Application Data

(60) Provisional application No. 61/527,155, filed on Aug. 25, 2011.

(51) Int. Cl.
| | |
|---|---|
| *B23K 11/00* | (2006.01) |
| *B23K 11/11* | (2006.01) |
| *B23K 11/18* | (2006.01) |
| *B23K 11/25* | (2006.01) |

(52) U.S. Cl.
CPC .......... *B23K 11/115* (2013.01); *B23K 11/185* (2013.01); *B23K 11/257* (2013.01)

(58) Field of Classification Search
CPC ................................ B23K 11/24; B23K 11/00
USPC .................. 219/78.01, 108, 110, 111, 86.22
See application file for complete search history.

(56) References Cited

U.S. PATENT DOCUMENTS

| | | | | |
|---|---|---|---|---|
| 4,072,843 A | * | 2/1978 | Szabo | 219/91.21 |
| 4,675,494 A | * | 6/1987 | Dilay | 219/91.21 |
| 4,734,555 A | * | 3/1988 | Ferguson | 219/109 |
| 4,835,356 A | * | 5/1989 | Abe | 219/91.21 |
| 4,973,814 A | * | 11/1990 | Kojima et al. | 219/110 |
| 5,349,153 A | * | 9/1994 | Prucher | 219/120 |
| 5,406,045 A | * | 4/1995 | Kiriishi et al. | 219/110 |
| 5,483,035 A | * | 1/1996 | Kawai et al. | 219/110 |
| 6,046,424 A | * | 4/2000 | Jochi | 219/110 |
| 6,320,774 B2 | * | 11/2001 | Jochi et al. | 363/98 |
| 6,861,609 B2 | * | 3/2005 | Sigler | 219/117.1 |
| 8,502,105 B2 | * | 8/2013 | Tanaka et al. | 219/86.22 |

(Continued)

FOREIGN PATENT DOCUMENTS

| | | |
|---|---|---|
| CN | 101172315 A | 5/2008 |
| EP | 1175951 A2 | 1/2002 |
| EP | 1973686 A2 | 10/2008 |

*Primary Examiner* — Dana Ross
*Assistant Examiner* — Ayub Maye
(74) *Attorney, Agent, or Firm* — Reising Ethington P.C.

(57) ABSTRACT

Aluminum-base alloy workpieces have surfaces with films of aluminum oxide which inhibit good contact with weld faces of resistance spot weld electrodes and the faying surfaces of, for example, sheet workpieces stacked for welding. Sometimes, the surfaces of the sheets also are coated with an adhesive or a sealer which further complicates welding. But in accordance with this invention, weld faces of opposing, round, copper welding electrodes are pressed against opposite outside surfaces of the sheets at a spot weld site and weld current is applied to the electrodes in accordance with a three-stage weld schedule to better form each weld. The weld schedule comprises a Conditioning stage (stage 1), a weld nugget Shaping stage (stage 2), and a weld nugget Sizing stage (stage 3).

20 Claims, 3 Drawing Sheets

(56) References Cited

U.S. PATENT DOCUMENTS

| | | |
|---|---|---|
| 2001/0027962 A1* | 10/2001 | Moro .................... 219/85.22 |
| 2008/0078749 A1 | 4/2008 | Sigler et al. |
| 2009/0127232 A1 | 5/2009 | Sigler et al. |
| 2009/0255908 A1 | 10/2009 | Sigler et al. |
| 2009/0302009 A1 | 12/2009 | Sigler et al. |
| 2010/0258536 A1 | 10/2010 | Sigler et al. |
| 2011/0266260 A1 | 11/2011 | Sigler et al. |

\* cited by examiner

WELD SCHEDULE FOR RESISTANCE SPOT WELDING OF ALUMINUM ALLOY WORKPIECES

This application claims priority based on provisional application 61/527,155, titled "Weld Schedule for Resistance Spot Welding of Aluminum alloy Workpieces," filed Aug. 25, 2011, and which is incorporated herein by reference.

TECHNICAL FIELD

This invention pertains to improvement in the formation of resistance spot welds in stack aluminum-base alloy workpieces. More specifically, this invention provides a method utilizing the varied application of current flow values and times in such resistance spot welding in three separate steps or stages to allow weld faces of the electrodes to better engage the aluminum workpieces, to better initiate formation of the molten weld nugget in the center of the faying surface contact zones, and to quickly achieve the target weld nugget size.

BACKGROUND OF THE INVENTION

Resistance spot welding typically comprises pressing round weld face surfaces of two opposing, high conductivity, copper electrodes against opposite sides of two or three overlapping metal sheets (sometimes called a "stackup"), and passing an electric current for a period of several milliseconds to a few hundreds of milliseconds between the electrodes through the sheets to form a weld nugget at the sheet-to-sheet interface, called the faying interface.

Resistance spot welding of aluminum workpieces (typically aluminum-based alloys containing 85% or more by weight aluminum) at high volume is considered to be very difficult within the automotive industry because of several issues. The workpieces are often rolled aluminum alloy sheet materials, but may also be extrusions or castings of suitable complementary shape for spot welding. While complementary-shaped aluminum-based alloy body panels may be placed together and joined by a series of suitably located spot welds, the aluminum workpieces may be of equal or different thicknesses, of the same or different aluminum alloys, coated on the surface, and may have adhesives or sealants applied along weld flanges. There may be small gaps between the assembled panels and one or both of the opposing welding electrodes may be positioned at an angle slightly different from its intended welding position.

One of the major issues is the presence of a tough, adherent, non-conducting oxide film on the aluminum substrate surface. This oxide film can cause excessive overheating at both electrode/sheet interfaces as well as the sheet-to-sheet faying interface. Typical solutions to the problem of electrode/sheet interface overheating include the use of electrodes designed with large, flat weld faces that reduce the current density and, thus, heating at these locations. The use of large, flat electrodes produces undesired consequences for manufacturing. These types of electrodes are 1) sensitive to gaps between workpieces, 2) sensitive to electrode orientation, i.e., being off-angle or off-normal with respect to the workpiece surface, and 3) require large flanges on the workpieces to accommodate the large electrode body diameter and weld face on the electrode.

Several electrode designs and dressing processes that address these issues may be found in patents and patent applications, including one or both of the inventors herein and owned by the assignee of this invention: U.S. Pat. No. 6,861,609 (Mar. 1, 2005) and U.S. patent applications published as 20100258536, 20090302009, 20090255908, 20090127232, 20080078749. The problem of the oxide film and resultant electrode/sheet overheating has been addressed by placing geometric features, such as a micro texture or a series of ridges and grooves on the weld face that, under weld load, penetrate the oxide layer on aluminum to lower contact resistance and heat generation at that interface. The reduction in electrode/sheet heating has two direct benefits. First, it allows a smaller electrode with less thermal mass to be used, which decreases flange requirements. Second, it allows a sharper electrode weld face curvature to be used that better concentrates welding current. This makes the welding process much less sensitive to both the electrode orientation on the workpiece, i.e., the electrode being off-angle with respect to the workpiece, and the presence of gaps between workpiece surfaces.

Despite these very significant improvements in process performance attained by solving the issue of high contact resistance at the electrode/sheet interfaces, issues remain to be solved before the aluminum spot welding process is considered sufficiently robust for high volume manufacturing. Many of these issues are related to the presence of surface oxide films at the sheet-to-sheet or faying interface, which is unaffected by modifications to the electrode weld face. These issues are related, in part, to the nature of the direct current welding process typically used in automotive aluminum welding which is termed Medium Frequency Direct Current or MFDC. This process uses an inverter type weld control that receives a three phase, 60 Hz alternating current potential at 480 volts rms (in the United States) and provides a single phase square wave of higher voltage, about 650 volts, to the MFDC transformer at a frequency of approximately 1000 Hz. The transformer reduces the high voltage waveform supplied by the weld control to a much lower welding voltage (for example 13 volts at a 50:1 transformer turn ratio) at much higher current. The low voltage, square wave output at the transformer is then rectified with high current capacity diodes to provide DC current for delivery to the welding electrodes and stackup of workpieces. During setup for producing many like welds on a series of workpieces, a suitable weld current and weld time are predetermined. The MFDC weld controller is then programmed to deliver a nearly constant current (e.g., twenty-five to thirty kilo amperes) to the welding electrodes pressed against a workpiece over a weld cycle of about 250 to 300 milliseconds. In any DC process, and particularly one where current flow is programmed to be nearly constant, as with MFDC, one electrode (positive) runs considerably hotter than the other electrode (negative) when in contact with aluminum substrates. This temperature bias of the electrodes can affect weld nugget formation and growth, especially for stickups of sheet workpieces that are asymmetrical with respect to both thickness, i.e., high thick/thin ratios, and material, e.g., welding Aluminum Alloy 5754-O to Aluminum Alloy 6111-T4 sheet. AA5754-O composition limits are 2.6-3.6% Mg, <0.4% Si, <0.5% Mn, <0.4% Fe, and <0.1% Cu (balance substantially all aluminum), while age hardenable AA-6111-T4 composition limits are 0.5-1.0 Mg, 0.6-1.1% Si, 0.1-0.45% Mn, <0.4% Fe, and 0.5-0.9% Cu. This can result in stackups welding better in one orientation relative to electrode polarity than the other including producing larger welds or greater weld penetration in one orientation than the other, which in production operations would not be ideal. In addition, the hotter running positive electrode is more prone to wear and, thus, can shorten electrode life by requiring more frequent dressing.

In addition to the polarity effects, the standard constant current weld schedules that have been used in production applications of aluminum spot welding can produce other undesired issues. These schedules are based on the application of a constant current, e.g., 27 kA, over a set time, e.g., 200 milli-seconds (ms), at a constant force of the electrodes against the workpiece surfaces. The issues that have been discovered include excessive electrode wear, sensitivity to weld spacing for heavy gauge stackups, inconsistent size and quality of the first weld, weld microstructures that lead to undesirable weld fracture modes, and weld shapes that lead to premature expulsion and poorer weld quality. The undesirable fracture modes, which occur in peel or tensile loading, include weld fracturing along the faying interface or fracturing around the weld nugget perimeter and, thus, not forming a button that pulls completely through the sheet thickness. Finally, the standard constant current weld schedules are less robust in the presence of sealers or adhesives. With adhesives or sealers present, these schedules tend to result in nuggets with more defects that tend to fracture in undesirable modes especially when subject to peel loading.

There remains a need for improved practices for resistance spot welding of aluminum alloy sheet metal workpieces and other workpiece shapes.

SUMMARY OF THE INVENTION

Practices of the invention will be described using a stackup (an assembly) of two or three aluminum-based alloy sheet workpieces. Sheet workpieces often have thicknesses in the range of about one-half to about four millimeters and a stackup for welding may be formed of the same or different aluminum alloys and of different thicknesses. In many welding operations, more than one weld may be formed simultaneously on a stackup of sheets, and hundreds of welds may be formed on many stackups with a welding apparatus setup during a working shift. It is necessary to manage the welding equipment and process to reliably and repeatedly produce uniformly good welds on aluminum alloy workpieces.

Embodiments of the invention are based on the discovery that good welds may be formed more reliably on aluminum workpieces by varying the welding current in distinct welding stages or steps during the formation of each resistance spot weld. In accordance with embodiments of the invention, welding current is applied at different levels during three specific steps of each spot weld cycle with cooling times or "off" times between each step. The equipment for delivery of the direct current waveform to the welding electrodes usually comprises a weld gun with either high-conductivity arms or high-conductivity cables for delivering the current to the electrodes, a MFDC transformer, and an inverter type programmable electronic control. To provide the proper waveform for welding automotive gauge aluminum workpieces, the welding system, i.e., programmable inverter weld control, MFDC transformer, and weld gun, must be able to provide high current output and fast rise times delivered to the welding electrodes at a programmed schedule determined during set up of the weld job. Such members of this welding system are commercially available. Current rise times measured at the electrode should preferably be on the order of ~10 ms to achieve 40 kA or ~4 kA/ms. Significantly slower rise times will not be able to produce the desired waveforms satisfactorily and welding performance will be compromised. Each part of the weld gun system, i.e., control, transformer, and gun, affects both the maximum current output and the current rise time.

The first stage of our spot welding process is considered a Conditioning stage or step. It begins as two opposing welding electrodes have been positioned to engage opposite sides of a stackup of, for example, two sheet workpieces with a predetermined stable clamping force. The electronic control is operated to limit the voltage delivered by the welding transformer. This can be accomplished by putting the programmable weld control into a suitable automatic voltage compensation mode (AVC) or similar mode. As an alternative to the voltage compensation mode, the Conditioning current can be programmed in constant current mode with a gentle slope over 10 ms or more from a low current value (~3 kA) up to the final desired Conditioning current. Again, the objective is to obtain a consistent, stable resistance at the weld site, while not allowing the sheets to melt at the faying interface. The current is brought up gradually over a few milliseconds to a level for decreasing the electrical resistance to a consistent low value at both the electrode/sheet interfaces and the underlying faying surfaces. In many weld setups the current increases from about 3 kA to about 10 kA. In general, it is preferred to adjust the current to a level just below that at which substrate melting occurs. Current flow in this Conditioning stage is maintained for about 20 ms to about 60 ms. The current flow is suitably maintained for a time to obtain a stable and consistent current level.

During this Conditioning step, the electrode/workpiece interface is heated; permitting shaped features of the electrode weld faces to make better contact through the oxide coatings and with the metal workpiece surfaces. The resistance as measured between the electrodes decreases and the setup is now better prepared for molten weld nugget initiation and growth. Current flow is turned off by the weld control for about 10 ms to cool the electrodes preparatory to the next stage in this spot weld process. This length of off time allows the current level to decay to zero. Longer cool times could be used, but would only decrease welder throughput.

The second stage of our spot welding process is a weld nugget Shaping stage. This Shaping stage is designed to initiate formation of a good, round, centered (on the axis of the opposing electrodes), molten weld nugget in spite of the polarity of the weld electrodes, or slightly off angle alignment of the electrodes to the workpiece, or non-ideal fitup of the workpieces, or the presence or absence of non-metallic adhesives or sealers at the faying surfaces. This is accomplished by causing the current to flow at a relatively high value (e.g., between 20 kA and 50 kA) over a relatively short period of time, for example, a minimum time of about six to ten milliseconds and suitably about six to fifty milliseconds. The high target current and short times require use of suitable welding system components. As discussed previously, to achieve the target shaping current over these short times, the inverter weld control, MFDC transformer, and weld gun must be appropriately designed to be able to achieve the target current and current rise time. Slow rise times prevent the attainment of the target current within the small time window of the Shaping step, which is necessary for the function of this step. Slow rise times can be due to slow weld control hardware or software, insufficient MFDC transformer voltage, or high weld gun inductance. The purpose of this high current step is to initiate formation as rapidly as possible of a liquid (molten) weld nugget in the center of the faying interface contact zone. This stage is kept short while seeking to commence formation of a weld nugget, suitably about at least three millimeters in diameter. The current level is kept low enough to avoid sticking between the electrodes and workpieces and to avoid expulsion of metal at the electrode/sheet interface. The determination of the current and time for a set up of aluminum workpieces for welding may be determined by experience and or trials. Expulsion at the faying interface can occur, but since the molten nugget has not yet fully formed, it causes no damage to the final nugget structure or properties. If it is found necessary to use a shaping time greater than about thirty milliseconds, it is preferred to use two shorter current pulses with an intermediate cool or off time to reduce current.

Once nugget shaping has been accomplished, the current is turned off by the controller for about five milliseconds to allow it to decay. The purpose of such current off time is two-fold. First, it allows for some cooling at the electrode-sheet interface. Second, it prevents the initiated molten weld nugget from overheating. Removing this cooling step typically leads to overheating during the sizing step and severe interfacial expulsion. Allowing the initiated nugget to cool helps bring the process under control. However, this cooling step cannot be so long as nugget solidification occurs. If the nugget were to solidify it would act as a short between the sheets and further current flow during the sizing step would not achieve the desired weld size.

The third stage of the welding process provides for growth and sizing of the now-initiated weld nugget. This Sizing stage is initiated while the nugget is still in a molten state. A lower weld current is used in this Sizing stage than in the nugget Shaping stage. For example, a weld current of about 15 to about 40 kA may be suitable in this third stage. The sizing time is determined based on the thickness of the thinnest sheet in a two sheet stackup and on the thickness of the second thinnest sheet in a three sheet stackup. A weld nugget of suitable size, e.g., about six millimeters in diameter for a two millimeter thick sheet, is produced. The current is adjusted to achieve a desired weld nugget size. And the duration of this stage is the longest of the overall weld schedule, often requiring from about twenty milliseconds to about two-hundred milliseconds. If welding electrode wear is excessive, it may be preferred to break current flow into pulses of about ten to about thirty millisecond durations of heating (on time) with short cool times (off time) of one millisecond to ten milliseconds.

Apart from the brief cool times between the spot weld stages, the weld process is continual and typically requires less total weld time (combined times of step 2 and step 3) than conventional MFDC or AC spot welding of aluminum. It is found that the three-stage weld schedule of this invention more reliably produces good welds, and this result is attained over the formation of many welds. Further, less power is consumed.

Other objects and advantages of this invention will be apparent from a detailed description of preferred embodiments which follows in this specification. Reference will be made to drawing figures which are described in the following section of this specification.

DESCRIPTION OF PREFERRED EMBODIMENTS

Figure 1:
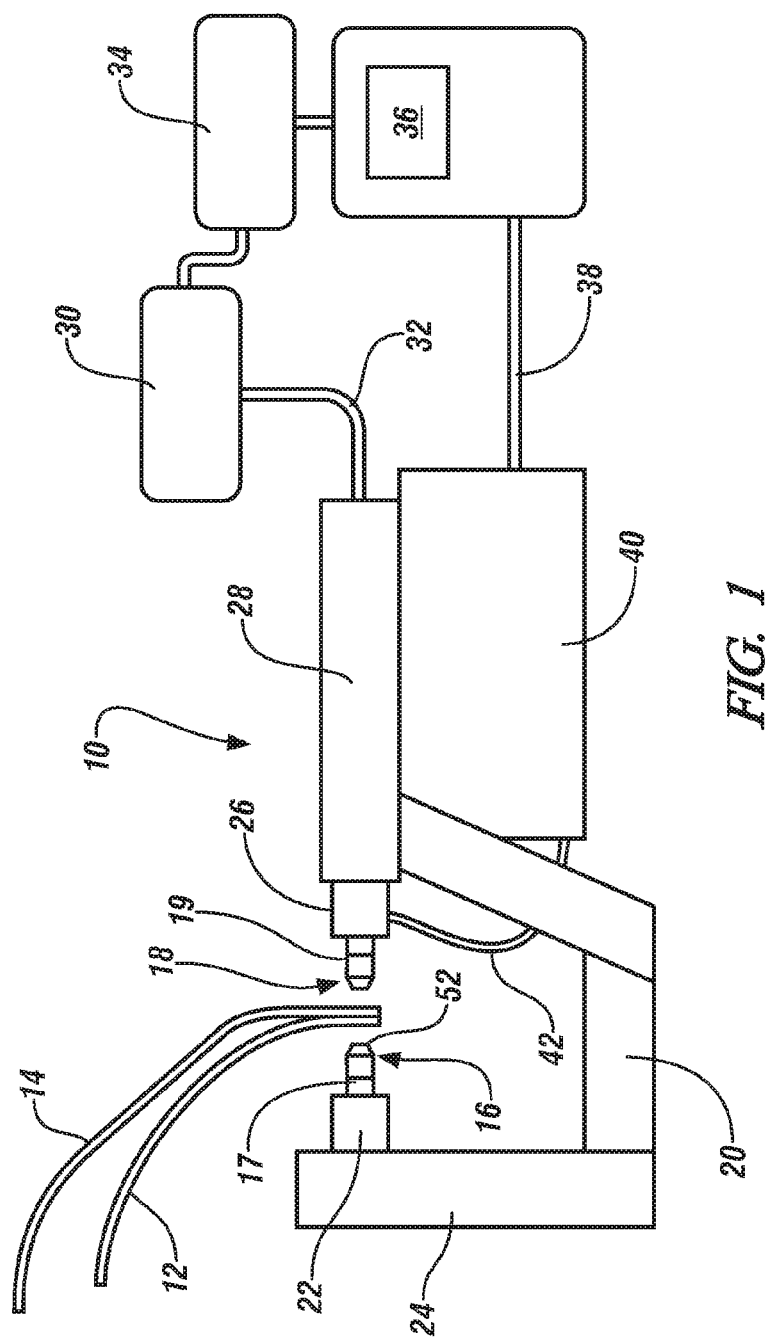
FIG. 1 is a schematic side view illustration of a welding system including weld electrodes and two aluminum alloy sheet workpieces such as may be used in practicing welding methods of this invention.

The weld schedule of this invention may be practiced using welding equipment such as that illustrated schematically in FIG. 1. FIG. 1 in this specification is also presented as FIG. 1 and described substantially as follows in our co-pending U.S. patent application, published as U.S. 2011/0266260 and also as FIG. 1 as described in U.S. Pat. No. 6,861,609 of one of us.

In FIG. 1, a representative spot welding gun apparatus 10 with associated equipment (e.g., items 30, 32, 34, 36, 38, 40, and 42 described below) utilized in spot welding apparatus for aluminum-based alloy(s) workpieces is illustrated. In such welding operations, an assembly of two or more aluminum alloy sheet panels 12 and 14 to be welded is prepared and delivered by a conveyor or other device to the welding gun apparatus 10. The welding gun apparatus is typically mounted on a robot which moves the welding gun apparatus along the edges (e.g., flanges for welding) of aluminum alloy sheet panels 12, 14 to rapidly accomplish a succession of individual electrical resistance spot welds.

In FIG. 1, the metal panels 12 and 14 are shown poised between a pair of axially aligned and opposing electrodes 16 and 18 of a welding gun arm 20. The gun arm 20 is in the configuration of a C so that the weld faces (52 for electrode 16) of opposing electrodes 16 and 18 can be brought to bear and press upon opposite sides of the aluminum alloy panels 12 and 14. In the arrangement shown, electrode 16 is mounted on a shank 17 which is inserted in a holder 22 attached to a fixed arm 24 of the welding gun arm 20. The opposing electrode 18 is mounted on a shank 19 and inserted in another holder 26 carried on an air cylinder or servo motor 28. Air cylinder or servo motor 28 is adapted to axially move the electrode 18 into clamping engagement with the outer surface of the panel 14. A source of high pressure air from a remote source, not shown, delivers air through a programmable air regulator 30 through air line 32 to the cylinder 28 to provide clamping force. Alternatively, a servo-motor control provides current and voltage to the servo motor to provide clamping. During a spot welding sequence, the timely application of air pressure to the air cylinder 28 or movement of the servo motor advances holder 26 so that electrode 18 presses the sheets 12 and 14 against stationary electrode 16 with a force in the order of 500 to 1,500 pounds.

Weld gun 20, typically mounted on the end of a robot arm, is connected to a robotic controller 34. Robot controller 34 manages and actuates the programmable air regulator 30 and also actuates a programmed weld controller 36. Weld controller 36 regulates the passage of primary welding current to the welding transformer, which supplies current to the electrodes. On command of the welding controller 36, primary current is delivered through primary current line 38 to weld transformer 40. Weld transformer 40 converts the primary AC current to a lower voltage, higher AC current secondary welding current which is then rectified by suitable diodes into a DC current and provided through a secondary current line 42 and electrode holder 26 as well as conductive gun arm 20 and electrode holder 22.

When a welding operation is being considered for a new assembly or stackup of aluminum alloy workpieces, such as aluminum sheets 12, 14 in FIG. 1, actual testing or previous welding experience is usually considered in order to prepare a welding gun assembly and to program the related robot weld gun controller (e.g., controller 34 in FIG. 1) for closing weld guns at a predetermined clamping pressure at a weld site, or series of weld sites, on a stackup of workpieces, and for determining the programming of the weld controller 36 for operation of weld transformer 40 and for delivery of a suitable sequence of DC weld currents in accordance with the Conditioning, Shaping, and Sizing weld steps of each weld formed in accordance with practices of this invention.

The method for determining the welding currents for Conditioning, Shaping, and Sizing steps are given below. This is done typically with coupons that represent the metal stackups to be welded. Current, voltage, power, and resistance at the electrodes are monitored using instrumentation separate from the weld control. For the Conditioning step, current is adjusted current to a level just below that at which substrate melting begins to occur. Once this current level is determined, time is adjusted to insure that a stable, consistent resistance has been achieved between the two electrodes. A short cool or off time is typically inserted after Conditioning to allow the weld control software to reset. For the Shaping step, current is adjusted at minimum time (~6-10 ms) by raising the current level until a round, centered nugget forms without substrate/electrode reaction, i.e., sticking electrode to substrate or melting of the substrate surface. If substrate/electrode reaction occurs during Shaping, the Shaping time is increased in small increments and concurrent with current adjustments to initiate a satisfactory nugget without substrate/electrode reaction. Nugget initiation should include the formation of a fused area greater than 3 mm in diameter near the center of the contact patch formed at the faying interface of the sheets. For Shaping times beyond ~30 ms the Shaping current pulse should be broken into two shorter pulses with a short cool between them. Because of the high current levels achieved in the Shaping step, once the nugget is shaped, a short cool or off time of ~5 ms is inserted to allow the electrode/sheet and faying interfaces to cool. The Sizing time is set as a function of the Determining Thickness of the stackup. For a two sheet stackup the thinnest sheet is the Determining Thickness. For a three sheet stackup the second thinnest sheet is the Determining Thickness. Sizing times vary between about 30 ms for a 1.0-mm Determining Thickness to about 100 ms for a 3.0-mm Determining Thickness. Once the Sizing time is determined, current is adjusted to achieve the desired weld size. If electrode wear is excessive, the Sizing continuous current pulse is modified to include heat and cool pulses, typically 10 ms to 30 ms of heat with 1 ms to 10 ms of cool.

Commercial robot controllers are available and may be selected for managing the opening and closing of welding electrodes with respect to the workpieces. Also there are commercial programmable weld controllers available for the practice of the subject three-step weld process of this invention. Following are required characteristics of the programmable weld controller, associated transformer, electrical connections, and weld guns with their weld electrodes.

The inverter weld control is programmable so as to be loaded with predetermined instructions for the conduct of the Conditioning, Shaping, and Sizing steps of this weld schedule. Further, the programmable inverter weld control needs to have sufficient primary current capability to achieve the desired secondary current based on the transformer turns ratio. For a typical transformer turns ratio of 50:1, the inverter weld control requires a primary current capacity of at least 1000 amp and preferably 1200 amp to achieve the target 50 kA secondary current (turns ratio times max primary current) desired to reproduce these weld schedules for the thickest aluminum sheets. Weld controls are readily available with these primary current capacities. The weld control can also affect the secondary current rise times either through the hardware or software used by the control. Some controls limit the rate of current rise either through design or simply the lack of speed of the internal processors or software. Assuming a typical turns ratio of 50:1 for the transformer (other turns ratios of 40:1 to 60:1 are available) experience has shown that the weld control primary current rise time should be at least 80 A/ms or 10 ms to achieve 800 amp output, which would translate to a 4 kA/ms rise time for a transformer with a turns ratio of 50:1.

As described above, the Conditioning, Shaping, and Sizing weld schedule is developed by external monitoring of the current, voltage, power, and resistance at the electrodes, The weld control typically monitors only current, usually primary current and occasionally secondary current. Voltage, resistance, and power are not monitored by the weld control. The purpose of the weld control is to reproduce the desired Conditioning, Shaping, and Sizing (CSS) wave forms once they have been established by the above set-up procedure.

The MFDC transformer should also meet minimum requirements. This includes achieving the target maximum secondary current for the desired waveforms. For welding automotive structures the target maximum current is typically about 50 kA while for welding lighter gauge closure panels this target is typically 35 kA. Output from both the transformer core and diodes need to be capable of achieving these current levels. For example, a transformer with a 40:1 turns ratio in its core would not achieve the desired 50 kA output for structural welding using either a 1000 amp or 1200 amp inverter control. Also, some transformer diodes may have limits on current levels that can make the transformer unsuitable for this CSS three step weld process.

Assuming that the weld control produces both sufficient primary current and primary current rise times to supply the transformer and the transformer core and that the diodes have sufficient current capability, then the transformer output is controlled by two final factors: resistance and inductance of the weld gun arms and/or cables. While every aspect of the welding system may be adequate for producing the desired waveforms, if gun resistance and inductance are not satisfactory then both maximum current and current rise time are compromised. Gun resistance is suitably measured along the gun arm between the electrodes and transformer. For example, typical resistance measurements may give 50 µ-ohm per arm with a total of 100 µ-ohm for both arms. This level of resistance will allow a 1200 amp inverter weld control with a 50:1 turns ratio MFDC transformer to achieve 60 kA. Higher resistances will begin reducing the maximum current that can be achieved. Secondary current rise times are affected by gun inductance, which is directly related to the loop area formed by the gun arms and/or cables. Large loop areas act to slow the current rise. Preferably, loop area should be less than about 300 square inches, e.g., 10 inches by 30 inches, for a 50:1 turns ratio transformer. This transformer has a maximum voltage of 13 volts. Larger loop areas would require transformers with higher voltages or lower turns ratios, e.g., a 40:1 turns ratio with 16.25 volts. To summarize, the entire welding system must be designed to achieve the required weld currents and rise times, which requires the correct weld control, MFDC transformer, and weld gun capabilities.

To achieve the desired waveform at the weld site, a relatively high current (in kilo-amperes, kA) is delivered to the electrodes at a relatively low voltage over a period of milliseconds, typically less than 200 ms. The welding system is capable of delivering the required voltage and current to the electrodes. The current, voltage, electrical resistance and power consumed at the electrodes are typically measured independently at the weld site. The weld controls can be used to measure primary or secondary current. Current measurements, either measured independently or by the weld control, are made using a single turn coil around wither the primary or secondary current lines. Voltage is measured independently by claiming voltage directly to the electrodes. From the current and voltage measurements, resistance (R=V/I) and power (P=VI) are calculated. Measurements of current, voltage, power, and resistance are made during welding of coupons designed to represent the actual metal stackup. In accordance with preferred embodiments of the invention, the weld faces (for example 52 in FIG. 1) of the welding electrodes each present a spherical surface with concentric protruding rings for engagement with the aluminum oxide films on surfaces of the sheet workpieces, although electrodes with micro-textured weld faces should also benefit from this invention.

Figure 2:
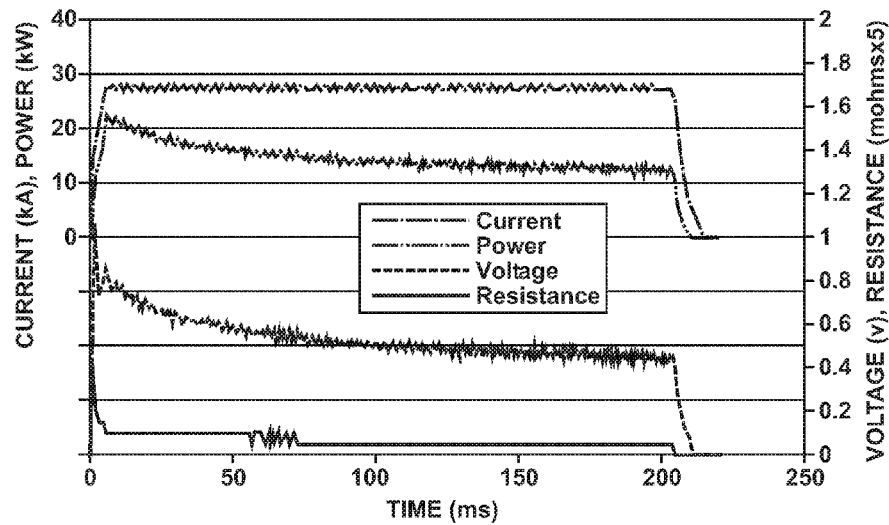
FIG. 2 is a graph of weld current (dash-dot line), voltage (short dash line), power (dash-dot-dot line) and resistance (solid line) as a function of time for a stackup of a 2.0-mm thick AA 5754 sheet to a 2.0-mm thick AA5754 sheet, welded with a conventional, constant continuous current resistance spot weld schedule.

Before further illustration of the three step weld process of this invention it may be useful to describe the constant DC current practice now used in electrical resistance welding of aluminum-base alloy sheet workpieces. FIG. 2 shows a typical constant continuous current (CCC) weld schedule used to spot weld 2.0-mm Aluminum alloy 5754 sheet to 2.0-mm 5754 sheet at an electrode force of 1200 lb. This amounted to a first weld between the sheet materials without a previous shunt path. This type of schedule was used to weld components for GM's aluminum EV1 vehicle produced some years ago. A similar, schedule of 167 ms is currently recommended by the Aluminum Association in their reference *Welding Aluminum Theory and Practice*. The current profile (dash-dot line) features a rise from 0 ms to welding current (27 kA) over several ms (milliseconds). The slope of the current rise is typically unimportant for these schedules since once the target current is attained it is held for a relatively long weld cycle time. Current rise is followed by holding the current for about 200 ms. Current is then shut off and falls to zero over several ms. The corresponding resistance (solid line) and voltage (short dash line) profiles both feature high initial peaks. The high voltage peak at the start of current flow, about 1.0 volt, results in arcing at the electrode/sheet interface and damage to the electrode weld face.

At the start of current flow for the CCC weld schedule, the voltage input is fairly high, but the current level is low. This combination does not provide sufficient power (dash-dot-dot line) early on to reliably initiate a weld nugget. The weld nugget may be initiated later in time or may initiate in random areas throughout the faying interface contact zone established by the closed welding electrodes.

Delayed weld nugget initiation may impact weld size and result in the wide variation of weld size that is observed for conditions that include high thickness ratios, dissimilar alloys, and variable weld spacing. It also drives the need for longer weld times to insure that the weld will be appropriately sized under a variety of conditions, i.e., with gaps present or welded off-angle.

Figure 3:
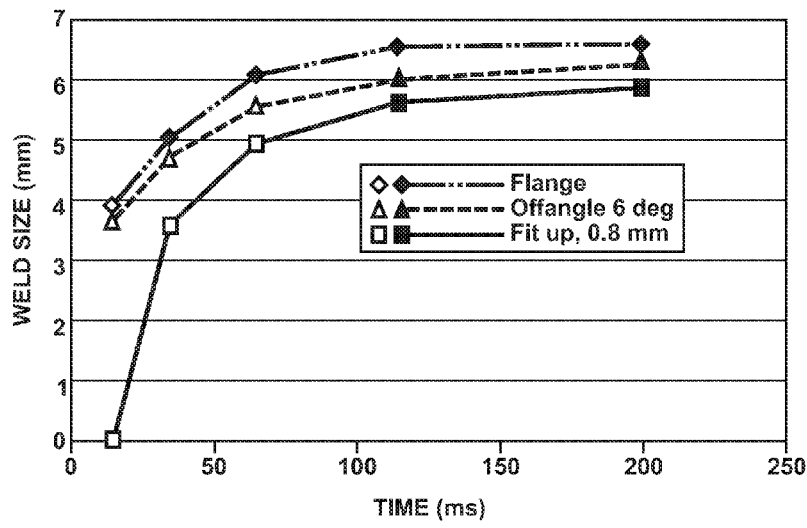
FIG. 3 is a graph showing weld sizes for a 2.0-mm 5754 stack-up welded under three different conditions using a constant continuous current schedule. Weld size is shown as a function of weld time for a conventional constant continuous current schedule. Weld sizes are shown for coupons in three conditions, i.e., flat coupons or coupons oriented normal to the electrode (called "flange" in FIG. 2 with diamond data points), coupons 6° off-angle to the electrode (triangle data points), and coupons with a 0.8-mm gap (square data points). Open symbols represent samples with undesired fracture modes, i.e., face tears or half buttons.

FIG. 3 shows weld sizes for a 2.0-mm 5754 stack-up welded under three different conditions using a constant continuous current schedule. Note that weld initiation is delayed for samples that are oriented 6° off-angle with respect to the electrode. This necessitates longer weld times to achieve satisfactory performance, i.e., a weld size of ~6 mm. Undesired fracture modes (open symbols) occurred out to weld times of 65 ms and weld sizes above 5 mm further demonstrating the lack of robustness of this schedule.

Nugget initiation that is not focused and located in the center of the faying interface contact zone, but is distributed randomly throughout the faying interface contact zone may cause poor weld penetration and subsequent undesired weld factures and poor weld shape which can lead to expulsion and poor weld quality. Random nugget initiation would also result in poor weld quality for locations with adhesives or sealers present since initiation in several small locations spread throughout the adhesive or sealer would most likely entrain a greater volume of the sealer or adhesive that produce undesired porosity in the weld microstructure.

Figure 4:
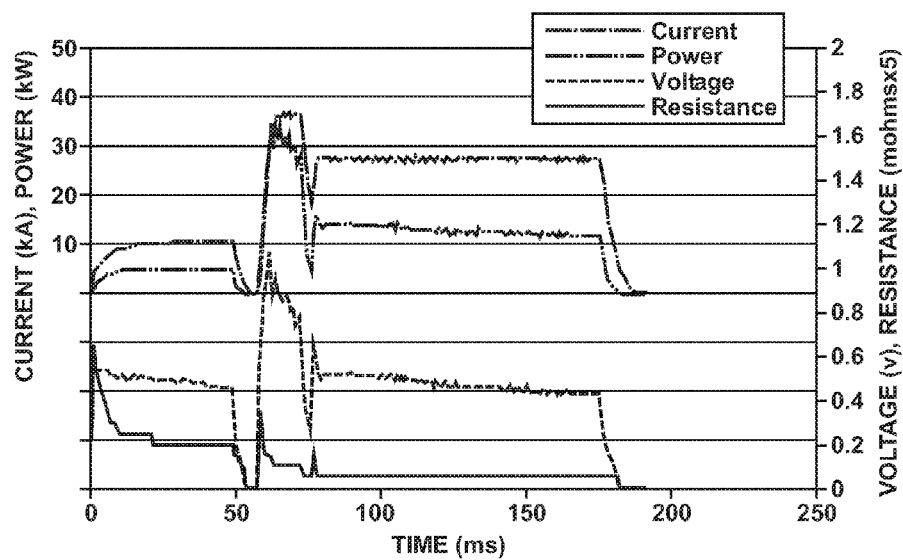
FIG. 4 is a graph of weld current (dash-dot line), voltage short dash line), power (dash-dot-dot line), and resistance (solid line) as a function of time for a 2.0-mm AA5754 to 2.0-mm AA5754 stackup welded with the Conditioning, Shaping, and Sizing (CSS) schedule of this invention.

This invention is a weld schedule that utilizes three separate steps for producing high quality welds with consistent size and shape over a wide range of conditions. The three distinct steps include Conditioning, Shaping, and Sizing (CSS). FIG. 4 is a graph of weld current (dash-dot line), voltage (short dash line), power (dash-dot-dot line), and resistance (solid line) between the electrodes as this three-stage weld schedule is applied to a stackup of a 2.0-mm thick AA 5754 sheet workpiece to a 2.0-mm thick AA5754 sheet.

Step 1—Conditioning: This step begins once the electrodes have achieved a stable weld force clamping the stackup at a weld site. The weld control is placed into a mode that regulates or limits the voltage applied by the welding transformer and is referred to as Automatic Voltage Compensation (AVC mode). FIG. 4 illustrates that during the Conditioning step the voltage at the electrodes starts at about 0.5 volt and drops to 0.4 volt. Weld current is brought up gradually to a level that decreases resistance at both the electrode/sheet and faying interfaces to a consistent, low value. The current typically increases from a low value of ~3,000 to between 5,000 and 10,000 amps. In general, the exact current level is chosen to be just below that at which melting occurs at the faying interface. Also, current flow is maintained between 20 ms and 60 ms. A minimum of 20 ms is required to insure that the resistance has broken down and stabilized sufficiently. Current flow beyond ~60 ms will typically not reduce resistance further, but only slow the welding process. For the example in FIG. 4, conditioning is done for 50 ms and reaches a current of ~10 kA. As an alternative to the voltage compensation mode used by the weld control, the Conditioning current can be programmed in constant current mode with a gentle slope from a low current value (~3 kA) up to the final desired Conditioning step current. Again, the objective is to obtain a consistent, stable resistance at the weld site while not allowing the sheets to melt at the faying interface.

During the Conditioning step heat is generated at the weld site, which allows the electrode's rings to establish more intimate contact at the electrode/sheet interface. Improved contact prevents excessive electrode damage from occurring during the shaping step where a high current level is applied. In addition, the resistance as measured between the electrodes decreases to a consistent value. In this example, FIG. 4, it is approximately 0.04 milli-ohms. For a given stackup, such as the one cited above, this consistent resistance value should be the same regardless of weld gun polarity or the presence or absence of any adhesives or sealers. This step insures that the current flow that occurs in the shaping step produces consistent weld size results. At the end of the Conditioning step, current flow is shut off for ~10 ms to allow the electrodes to cool prior to the Shaping step. This is shown as a drop in current and voltage at 50 ms in FIG. 4. Longer cool (or off) times could be used, but would only slow the welding process. Depending upon the weld control operation, the cooling step also allows the weld control to reset to provide maximum power at the start of the shaping step.

Step 2 Shaping: This step is designed to produce consistent molten weld nugget initiation, preferably centered between the opposing weld faces of the electrodes, regardless of the welding conditions, i.e., gun polarity, presence or absence of adhesive/sealer, poor face-to-face engagement of the sheet metal workpieces at their faying surfaces, off-angle electrodes, etc. Typically, current is forced to flow at a very high value to initiate a molten weld nugget as rapidly as possible in the center of the faying interface contact zone. Obtaining very high currents in short times places high demands on the welding system. As discussed previously, to achieve the target shaping current over these short times, the inverter weld control, MFDC transformer, and weld gun must be appropriately designed to be able to achieve the target current and current rise time. Slow rise times prevent the attainment of the target current within the small time window of the shaping step, which is critical for the function of this step. Slow rise times can be caused by slow weld control hardware or software, insufficient MFDC transformer voltage, or high weld gun inductance. FIG. 4 shows that the rise time to 35 kA is only 6 ms or 5.8 kA/ms, which is very fast. The Shaping pulse provides a very high power impulse to the stackup. For the example in FIG. 4, power is seen to peak at 35 kW at roughly 70 ms. Compare this to the peak achieved in FIG. 2 of only 22 kW.

Depending upon the sheet stackup, Shaping step current flow times of 6 ms to 50 ms are used, with peak current values typically between 20 kA and 50 kA. Assuming that the welding system, i.e., inverter control, MFDC transformer, and weld gun, can achieve the desired current rise times of >4 kA/ms, the shaping peak current and shaping time are determined within a couple of constraints. Shaping time is kept as short as possible to obtain the desired initial molten weld nugget, which is typically at least ~3 mm in diameter. Since, inverter design, transformer voltage, and welder inductance affects current rise time, it usually takes ~5 to 12.5 ms to reach the target peak current level of 20 kA to 50 kA. Shaping times are at least 6 ms, but typically greater than 10 ms. Shaping should be no more than 50 ms. For thin sheets such as 1.0-mm AA5754-0, low shaping currents are used such as 24 kA that can be achieved in a short time such as 6 ms, see Table below. Medium gauge sheet, such as 2.0-mm AA5754-0 may require 20 ms of shaping time. For heavier sheets such as 3.0-mm AA5754-0, longer Shaping times are needed. In this case 50 ms of Shaping time is used. To prevent excessive electrode/sheet reaction the shaping time is broken into a 20 ms pulse followed by a short cool time and then a 30 ms pulse. In general, when Shaping times are required above 30 ms to produce a satisfactory weld initiation site, then the Shaping pulse is broken in two with a short ~3 ms inserted between the two pulses. Peak current levels and weld times are kept below those that either create excessive reaction between the sheet and electrode weld face in the form of sticking or result in actual melting of the sheet exterior surface.

The following Table 1 presents illustrative times for Conditioning, Shaping, and Sizing for the specified Sheet 1 and Sheet 2 Aluminum Alloy compositions and thicknesses. Column 4 illustrates Shaping peak RMS current values for respective sheet combinations. The last column presents the recommended weld times in milliseconds of the Aluminum Association.

TABLE I

Conditioning, Shaping, and Sizing weld parameters

| Sheet 1 | Sheet 2 | Conditioning time (ms) | Shaping time (ms) | Shaping peak current minus Sizing RMS current (ka) | Sizing time (ms) | Aluminum Association* recommended weld time (ms) |
|---|---|---|---|---|---|---|
| 1.0-mm 5754 | 1.0-mm 5754 | 40 | 6 | 3 | 30 | 133 |
| 1.0-mm 5754 | 2.5-mm 5754 | 40 | 20 | 3 | 60 | 133 |
| 1.5-mm 5754 | 1.5-mm 5754 | 40 | 16 | 4 | 80 | 166 |
| 2.0-mm 5754 | 2.0-mm 5754 | 40 | 20 | 10 | 90 | 166 |
| 2.5-mm 5754 | 2.5-mm 5754 | 40 | 15 + 20 | 10 | 100 | 250 |
| 3.0-mm 5754 | 3.0-mm 5754 | 60 | 30 + 20 | 9 | 100 | 250 |

*Welding Aluminum Theory and Practice, Aluminum Association Inc., June 1991, pg. 13.3

Once sufficient shaping has been accomplished, the weld control stops driving the current for ~5 ms. During this time period, current falls rapidly until it is beneath the level used for sizing, but above zero. Preferably, the current should fall below the sizing level, but still be above at least 10 kA. The purpose of this step is two-fold. First, it allows for some cooling at the electrode/sheet interface. Second, it prevents the initiated weld nugget from overheating due to the high power pulse applied during the Shaping step. Removing this short cooling step typically leads to overheating of the nugget during the Sizing step and severe interfacial expulsion of molten metal. Allowing the initiated molten nugget to cool helps bring the process under control and helps stabilize the Sizing step. However, this cooling step cannot be so long that nugget solidification occurs. If the nugget were to solidify it would act as a short between the sheets, thus additional current flow during the Sizing step would not achieve the desired weld size.

Step 3 Sizing: Once the weld nugget has been initiated in the center of the faying interface contact zone by the Shaping step and allowed to cool, the rms current level is adjusted to a level that is below the peak current used for the Shaping step to achieve the target weld nugget size. This rms value is typically several kA below the peak current attained in the Shaping step as shown in the Table I. It is also several kA above the minimum current attained in the cooling step that follows Shaping. Sizing current values (rms) are typically between 15 kA for light gage aluminum alloy sheet to 40 kA for very heavy gauge sheet. The Sizing may be done with a constant current such that the peak and rms current values are the same or, if electrode wear becomes an issue, sizing may be done with a series of current pulses with an rms value several kA below the peak shaping current. Sizing is typically done with a current flow period of from 20 ms to 200 ms and is the longest part of the weld schedule. When current pulses are used each pulse is typically composed of ten to thirty milliseconds of on time (heating) and one to five milliseconds of off time (cooling).

The sizing step is typically much shorter than the times typically used to produce a weld with a constant current schedule. Table I above compares the sizing steps for various combinations of 5754 aluminum sheet with those recommended by the Aluminum Association for the prior art constant continuous current (CCC) schedule. The weld times are much shorter for our CSS schedules, particularly for heavier gauge materials. Shorter weld times result in steeper temperature gradients around the weld nugget that act to cool the nugget more quickly, producing a more refined microstructure. The refined microstructure has been found to be more resistance to fracturing under peel loading than microstructures obtained using typical weld schedules.

In addition, the shorter times for nugget Shaping plus nugget Sizing result in much less energy used to produce a weld nugget. In this example about 40% less energy is used to produce a weld nugget or button of acceptable size. This reduces thermal load on the MFDC transformer and weld gun components such as gun arms, cables, shunts.

Figure 5:
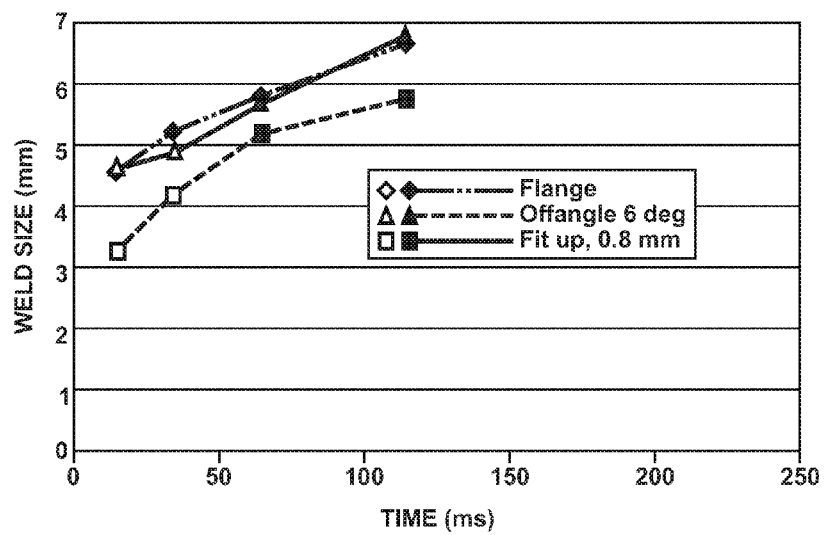
FIG. 5 is a graph of weld size as a function of weld time for a Conditioning, Shaping, Sizing weld schedule. Weld sizes are shown for coupons in three conditions, i.e., flat coupons (flange, diamond data points), coupons 6° off-angle to the electrode (triangle data points), and coupons with a 0.8-mm gap (square data points). Again, open symbols represent samples with undesired fracture modes, i.e., face tears or half button.

As an example, FIG. 5 shows weld sizes for a 2.0-mm 5754 stackup welded under three different conditions using a CSS schedule. Weld time is taken at the start of the shaping step and thus includes both the shaping and sizing pulses. Notice that even after 15 ms weld nuggets have been formed for all three conditions. The rapid formation of a weld nugget greatly eliminates variability in the process.

At a weld time of only 115 ms, weld size is ~6 mm or larger. Robust size has been achieved at shorter times that for the constant continuous current (CCC) schedule. This extends electrode life and refines weld microstructure. Undesired fracture modes occur only at very short weld times of 35 ms. At 65 ms and longer times, no undesired fracture modes were observed, which is improved performance compared to the CCC schedule, FIG. 2.

In many situations for the resistance spot welding of aluminum sheet metal workpieces it may be preferred to use welding electrodes like those disclosed in U.S. Pat. No. 6,861,609 (Mar. 1, 2005) and U.S. patent applications #20100258536, 20090302009, 20090255908, 20090127232, 20080078749. These electrodes have roughened or shaped welding faces that have been found to be useful in resistance spot welding of aluminum and such electrodes perform well when the spot welding is performed in accordance with weld schedules of this specification.

The above described practices of the invention are for purposes of illustration and are not to limit the scope of the invention.

The invention claimed is:

1. A method of forming resistance spot welds on aluminum-based alloy workpieces, the method comprising:
    forming a stack of two or more sheets of aluminum-based alloy workpieces, the stacked workpieces having faying surfaces at a resistance weld site and opposing outer surfaces at the weld site;
    pressing weld faces of opposing resistance weld electrodes against the outer surfaces of the workpieces at the weld site; and while pressing the weld faces against the workpieces,
    passing a first stage weld current between the electrodes and through the workpieces at the weld site lasting for a first period of milliseconds, the current being increased to a first stage current value that reduces the electrical resistance between the weld faces to a stable resistance value and heats the workpieces for engagement with the weld faces without melting of the workpieces at their faying surfaces, and then, momentarily reducing current flow to zero with the electrodes still pressed against the surfaces of the workpieces;
    passing a second stage weld current between the electrodes and through the workpieces at the weld site lasting for a second period of milliseconds, the peak current being increased to a second stage current value, larger than the first stage current value, for initiating molten weld nugget formation at the faying surfaces of the weld site, and, reducing current flow with the electrodes still pressed against the surfaces of the workpieces;
    passing a third stage weld current between the electrodes and through the workpieces at the weld site lasting for a third period of milliseconds, the current being at a third stage rms current value, smaller than the second stage peak current value, for completing molten weld nugget formation at the faying surfaces of the weld site, the third stage being longer than the second stage, and, again, stopping current flow for cooling of the weld site and solidification of the weld nugget;
    and then removing the weld faces of the opposing weld electrodes from contact with the outer surfaces of the workpieces.

2. The method of forming resistance spot welds on aluminum-based alloy workpieces as recited in claim 1 in which the weld faces of the weld electrodes are spherical and engage the workpieces with protruding circular concentric rings of uniform cross section.

3. The method of forming resistance spot welds on aluminum-based alloy workpieces as recited in claim 1 in which the weld faces of the weld electrodes are spherical and engage the workpieces with roughened surfaces.

4. The method of forming resistance spot welds on aluminum-based alloy workpieces as recited in claim 1 in which the first stage momentary weld current is slowly ramped to a value of about ten kilo-amperes and the first stage lasts about twenty to about sixty milliseconds.

5. The method of forming resistance spot welds on aluminum-based alloy workpieces as recited in claim 1 in which the second stage peak weld current is quickly ramped to about twenty to about fifty kilo-amperes and the second stage lasts about six to about fifty milliseconds, the value of the second stage weld current and the second stage time providing for formation of a molten weld nugget, at least three millimeters in diameter, and centered between the electrode faces.

6. The method of forming resistance spot welds on aluminum-based alloy workpieces as recited in claim 1 in which the third stage rms weld current value is about fifteen to about forty kilo-amperes and the third stage lasts about twenty to about two hundred milliseconds.

7. The method of forming resistance spot welds on aluminum-based alloy workpieces as recited in claim 1 in which the third stage weld current is passed between the electrodes as two or more pulses with heat times of ten to thirty milliseconds and cool times of one to ten milliseconds.

8. The method of forming resistance spot welds on aluminum-based alloy workpieces as recited in claim 2 in which the first stage momentary weld current is slowly ramped to a value of about ten kilo-amperes and the first stage lasts about twenty to about sixty milliseconds.

9. The method of forming resistance spot welds on aluminum-based alloy workpieces as recited in claim 2 in which the second stage momentary weld current value is quickly ramped to about twenty to about fifty kilo-amperes and the second stage lasts about six to about fifty milliseconds, the value of the second stage weld current and the second stage time providing for formation of a molten weld nugget, at least three millimeters in diameter, and centered between the electrode faces.

10. The method of forming resistance spot welds on aluminum-based alloy workpieces as recited in claim 2 in which the third stage rms weld current is about fifteen to about forty kilo-amperes and the third stage lasts about twenty to about two hundred milliseconds.

11. The method of forming resistance spot welds on aluminum-based alloy workpieces as recited in claim 2 in which the third stage weld current is passed between the electrodes as two or more pulses with heat times of ten to thirty milliseconds and cool times of one to ten milliseconds.

12. The method of forming resistance spot welds on aluminum-based alloy workpieces as recited in claim 3 in which the first stage momentary weld current is slowly ramped to a value of about ten kilo-amperes and the first stage lasts about twenty to about sixty milliseconds.

13. The method of forming resistance spot welds on aluminum-based alloy workpieces as recited in claim 3 in which the second stage momentary weld current is quickly ramped to about twenty to about fifty kilo-amperes and the second stage time is about six to about fifty milliseconds, the value of the second stage weld current and the second stage time providing for Formation of a molten weld nugget, at least three millimeters in diameter, and centered between the electrode faces.

14. The method of forming resistance spot welds on aluminum-based alloy workpieces as recited in claim 3 in which the third stage rms weld current is about fifteen to about forty kilo-amperes and the third stage lasts about twenty to about two hundred milliseconds.

15. The method of forming resistance spot welds on aluminum-based alloy workplaces as recited in claim 3 in which the third stage weld current is passed between the electrodes as two or more pulses with heat times of ten to thirty milliseconds and cool times of one to ten milliseconds.

16. A method of forming resistance spot welds on aluminum-based alloy workpieces, the method comprising:
    forming a stack of two or more aluminum-based alloy workpieces, the stacked workpieces having faying surfaces at a resistance weld site and opposing outer surfaces at the weld site;
    pressing weld faces of opposing resistance weld electrodes against the outer surfaces of the workpieces at the weld site; and while pressing the weld faces against the workpieces,
    passing a first stage weld current between the electrodes and through the workpieces at the weld site for a first stage time of milliseconds, the momentary current being slowly ramped to a first stage value that reduces the electrical resistance between the weld faces to a stable resistance value and heats the workpieces for engagement with the weld faces without melting of the workpieces at their faying surfaces, and then, momentarily reducing current flow to zero with the electrodes still pressed against the surfaces of the workpieces;
    passing a second stage weld current between the electrodes and through the workpieces at the weld site for a second stage time of milliseconds, the momentary current being quickly ramped to a second stage peak value, larger than the first stage peak current, for initiating molten weld nugget formation at the faying surfaces of the weld site, and, reducing current flow with the electrodes still pressed against the surfaces of the workpieces;
    passing a third stage weld current between the electrodes and through the workpieces at the weld site for a third stage time of milliseconds, the rms current being at a third stage value, smaller than the second stage peak current value, for completing molten weld nugget formation at the faying surfaces of the weld site, the third stage time being longer than the second stage time, and, again, stopping current flow for cooling of the weld site and solidification of the weld nugget; and then
    removing the weld faces of the opposing weld electrodes from contact with the outer surfaces of the workpieces.

17. The method of forming resistance spot welds on aluminum-based alloy workpieces as recited in claim 16 in which the weld faces of the weld electrodes are spherical and engage the workpieces with protruding circular concentric rings of uniform cross section.

18. The method of forming resistance spot welds on aluminum-based alloy workpieces as recited in claim 16 in which the weld faces of the weld electrodes are spherical and engage the workpieces with roughened surfaces.

19. The method of forming resistance spot welds on aluminum-based alloy workpieces as recited in claim 16 in which the first stage momentary weld current is slowly ramped to a value of about ten kilo-amperes and the first stage lasts about twenty to about sixty milliseconds; in which the second stage momentary weld current is quickly ramped to about twenty to about fifty kilo-amperes and the second stage time is about six to about fifty milliseconds, the value of the second stage weld current and the second stage time providing for formation of a molten weld nugget, at least three millimeters in diameter, and centered between the electrode faces; and in which the third stage rms weld current is about fifteen to about forty kilo-amperes and the third stage lasts about twenty to about two hundred milliseconds.

20. The method of forming resistance spot welds on aluminum-based alloy workpieces as recited in claim 19 in which the third stage weld current is passed between the electrodes as two or more pulses with heat times of ten to thirty milliseconds and cool times of one to ten milliseconds.

* * * * *